April 9, 1957 C. B. KROMSTEN 2,788,036
HANDSAW WITH BLADE ADJUSTING MEANS
Filed Feb. 11, 1955 2 Sheets-Sheet 1
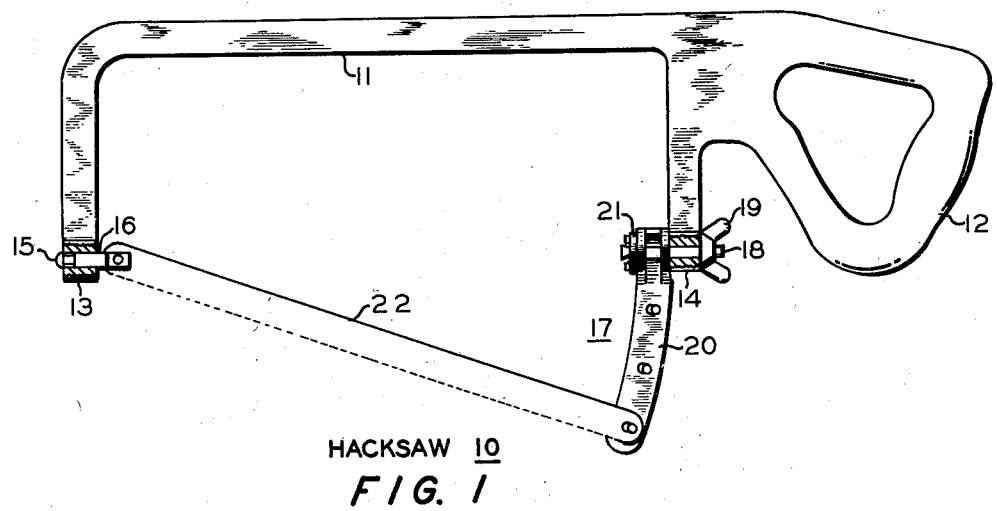
HACKSAW 10
FIG. 1
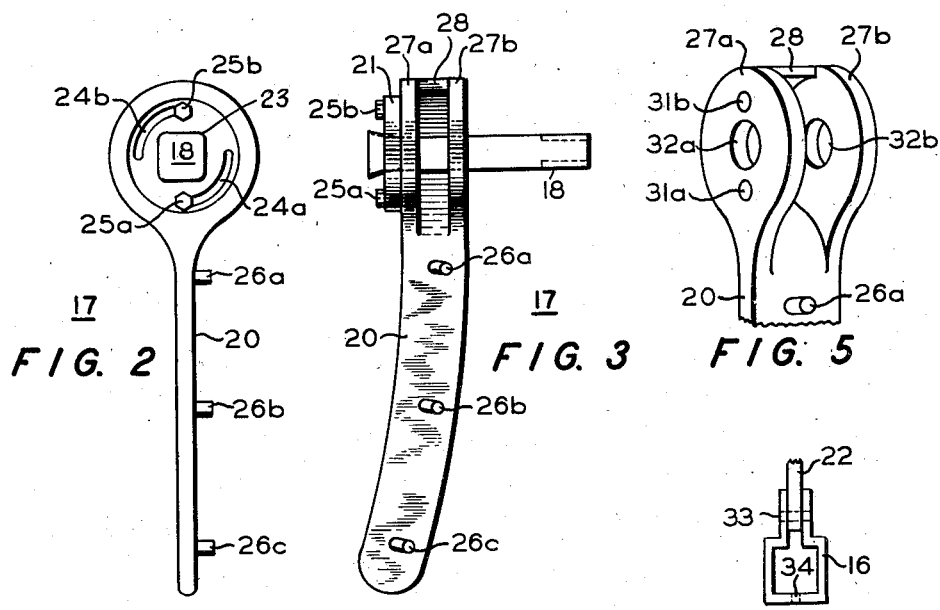

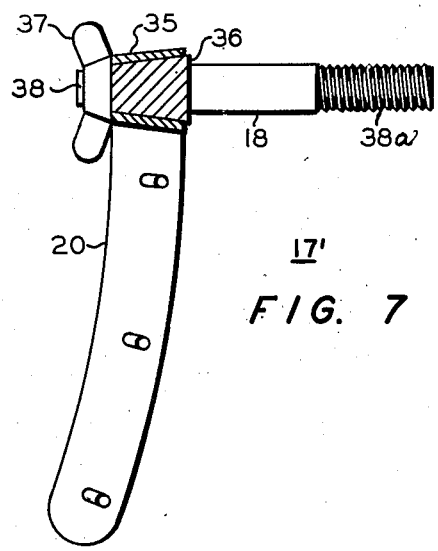
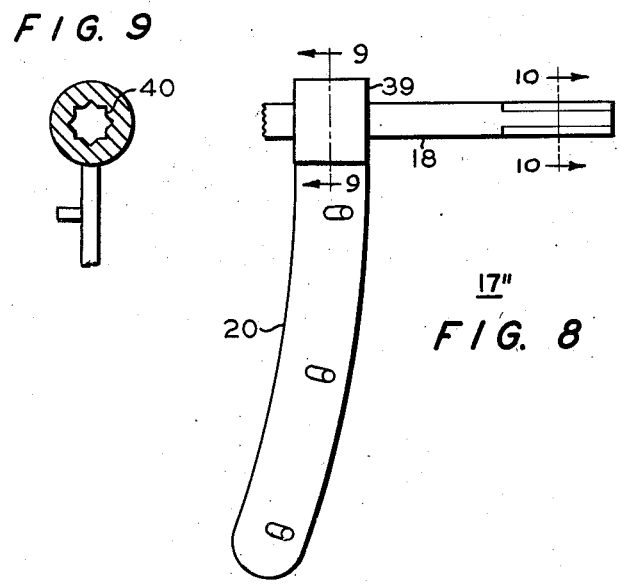

2,788,036

HANDSAW WITH BLADE-ADJUSTING MEANS

Carl Bertil Kromsten, Brooklyn, N. Y.

Application February 11, 1955, Serial No. 487,569

16 Claims. (Cl. 145—33)

This invention relates to saws and more particularly to modifications which increase the utility of saws having detachable blades.

Saws which have detachable blades usually have rigid frames to which blades are attached in a predetermined position. The use of such saws is frequently inconvenient in small quarters since the predetermined position of the blade may not be appropriate.

For example, a hacksaw has an elongated U-shaped frame which is manipulated by the means of a handle. The blade is placed in its predetermined position across the mouth of the U and rests in the plane of the frame. Because the frame must necessarily be rigid so as to be able to support the blade, the positions and sizes of the quarters in which the hacksaw can be used are thereby limited.

It is accordingly an object of the invention to provide an improved construction for saws having detachable blades.

A further object of the invention is to provide means for adjustably positioning a blade with respect to the frame of a saw so that the utility of the saw is thereby increased.

A further object of the invention is to provide a detachable unit for use with a hacksaw whereby the hacksaw can be utilized in an increased variety of positions.

An advantage of the detachable unit which is provided in accordance with the invention is that the unit can be utilized with commercially available types of saws. A further advantage of the detachable unit is that its construction permits the blade of a saw to be positioned outside of the plane of the saw frame. Thus, the detachable unit permits such saws to be used in many additional positions.

Another advantage of the detachable unit is that the unit is designed so that it can be removed completely so that the saw can be used in its usual manner.

The invention will be more readily understood from the following description taken together with the accompanying drawings in which:

Figure 1 illustrates a hacksaw embodying a detachable unit in accordance with the invention;

Figure 2 illustrates a front view of the detachable unit utilized in the apparatus of Figure 1;

Figure 3 is a side view of the detachable unit;

Figure 4 illustrates a washer of the type utilized in the detachable unit;

Figure 5 is a perspective view of a portion of the apparatus used to position the blade of the hacksaw of Figure 1; and Figure 6 illustrates a blade holder guide which can be utilized with the invention.

Figure 7 illustrates a detachable unit in accordance with a second embodiment of the invention.

Figure 8 shows a detachable unit in accordance with a third embodiment of the invention.

Figures 9 and 10 are sections through lines 9—9 and 10—10 of Figure 8, respectively.

Referring now to the apparatus shown in Figure 1, a hacksaw 10 is shown which comprises a frame 11 which is manipulated by a handle 12. It will be noted that the frame 11 is a U-shaped frame and, in accordance with the design of well-known hacksaws, lies in a single plane herein illustrated to be the plane of the drawing. At the ends of the frame 11 are situated the receptacles 13 and 14 which are used to house members which support the blade of the hacksaw. The receptacle 14 has a square cross-section.

The hacksaw 10 further comprises the bolt 15, the blade holder guide 16 and the detachable unit 17. The detachable unit 17 includes the bolt 18, the wing nut 19, the blade support 20 and the washer 21.

The bolt 15 is positioned in the receptacle 13 to anchor the blade holder guide 16 to which the forward end of a blade can be attached. Any conventional form of rotatable attachment can be employed at this point. The detachable unit 17 is positioned in the receptacle 14, as next described, and provides support for the remaining end of the hacksaw blade.

It can be seen in Figure 1, that the bolt 18 having one threaded end passes through the receptacle 14 and is tightened in position by means of the wing nut 19. The bolt 18 has a substantially square cross-section the corners of which are threaded to receive the wing nut 19. It will hereinafter be shown in detail that the blade support 20 is supported by the bolt 18 and is held in position thereon by means of the washer 21. The blade 22 is supported, as indicated in Figure 1, between the blade holder guide 16 and the blade support 20.

Referring now to the front view of the detachable unit 17 shown in Figure 2, it is seen that the head of the bolt 18 is squared and has corners such as the indicated corner 23. It is further seen that the washer 21, which is positioned between the head of the bolt 18 and the blade support 20, includes the arcuate slots 24a and 24b. The arcuate slots 24a and 24b are illustrated as being portions of a circumference whose center coincides with the centers of the bolt 18 and the washer 21. However, it is not necessary to the operation of the invention that these slots be exactly positioned as indicated. The lock screws 25a and 25b pass through the slots 24a and b respectively and have heads whose diameters exceed the width of the slots 24. Further shown in Figure 2 are the pins 26a, b and c which are fixed to the blade holder 20.

Referring now to the side view of the detachable unit 17 shown in Figure 3, it is seen that the blade support 20 includes the flanges 27a and 27b and a supporting wall 28 which spaces the flanges 27 from one another and which gives strength to the structure. It is clearly seen in Figure 3 that the washer 21 is interposed between the squared head of the bolt 18 and the flange 27a of the blade support 20. It will become apparent that the lock screws 25a and b pass through the arcuate slots 24a and b respectively and the flange 27a of the blade support 20.

It should be noted that the pins 26 are positioned on an arc. This arc is a portion of a circle whose radius is equal to the effective length of the blade 22 and whose center is at a pivot point in the blade holder guide 16.

Referring now to the washer 21 shown in Figure 4, it is seen that the washer 21 is perforated by a hole 29 which has a square shape as particularly indicated by the corner 30. The shape of the hole 29 is designed so that when the washer 21 is forced against the squared head of the bolt 18 there can be no relative motion in a radial direction between the bolt 18 and the washer 21.

A perspective view of the blade support 20 is illustrated in Figure 5 and the details of the flange 27a and 27b are seen with greater particularity. It should be noted that holes 31a and 31b pass through the flange 27a only and that it is not required that the flange 27b be perforated in this manner. The perforation of the flange 27b would however not be objectionable. The holes 31a and 31b are intended to receive the lock screws 25a and 25b and for this purpose the holes 31a or b may be threaded in order to engage the lock screws 25 without further apparatus being necessary. If, in any construction, it is not feasible to thread holes 31a and b, this feature can be omitted and the lock screws 25 may pass completely through the holes 31 to be held in position by suitable nuts. Also indicated in the flanges are the holes 32a and b which are round holes passing through the flanges 27 and through which is passed the bolt 18.

In Figure 6 is illustrated the blade holder guide 16 supporting the blade 22. The blade holder guide 16 is a commercially available blade holder guide and may be replaced by similar guides which are readily available. The hole 33, shown by dotted lines, passes completely through the assembly and provides the means by which the blade 22 is supported by the front end of the frame 11. A hole 34 is provided by which the blade holder guide 16 engages the bolt 15.

The apparatus described may be used in or to provide a hacksaw which can be used in previously unaccessible places or to extend the cutting depth of the saw. It will be noted that the bolt 18 is rotatably (at 90° angles) supported in the receptacle 14 and that the blade support 20 is designed to rotatably engage the bolt 18 by means of the holes 32. The radial motion of the blade support 20 upon the bolt 18 is restricted by means of the washer 21 which engages both the squared head of the bolt 18 and the blade support 20 by means of the arcuate slots 24 and the lock screws 25.

When the detachable unit 17 is positioned in the receptacle 14, the washer 21 is forced against the squared head of the bolt 18 and when the wing nut 19 is properly tightened, radial motion of the washer 21 is prevented. The blade support 20 is thus restricted to a radial motion as controlled by the lengths of the arcuate slot 24b when the lock screws 25 are loosened for this adjustment.

It is thus apparent that the bolt 18 may be radially positioned with 90° displacements as desired in the receptacle 14 and that the position of the bolt 18 will fix the position of the washer 21. The arcuate slots 24 and the lock screws 25 provide an additional adjustment. The blade support 20 can therefore be adjusted on a complete circle around the axis of the bolt 18 and it no longer remains necessary that the position of the blade 22 be restricted to the plane of the frame 11.

The pins 26, as previously indicated, are arranged on an arc whose radius is equal to the effective length of the blade 22. It is, therefore, possible to incline the blade 22 at various angles with respect to the horizontal line of the hacksaw 10. Stated otherwise, the pin 26 of the blade support 20 may be selected to support one end of the blade 22 on the circumference of any one of a number of circles concentric with the bolt 18 and according to how many pins 26 are included in the design.

Viewed academically it will be noted that the blade 22 supported on a pin 26 describes a conical shape when the blade support 20 is rotated with the bolt 18. Thus, many possible positions are provided in which the blade 22 may be fixed and this constitutes a great improvement over the previously known possibility of having but one possible position for the blade 22. It should be further noted, as previously indicated, that the diameter of the cone at its base can be controlled by attaching the blade 22 to any one of a number of the pins 26. The blade 22 may be affixed to the selected pin 26 by means of an appropriate nut not shown or the pins 26 may be inclined to prevent detachment of the blade 22 when the blade 22 is positioned in the blade holder guide 16.

The arrangement of the blade support 20 shown in Figure 1 illustrates the blade support 20 pointing outwardly from the frame 11. However, it will now be obvious from what has been said that the blade support 20 can be aimed inwardly towards the frame 11 as well. The use of the blade support 20 in the outward direction increases the distance between the blade 22 and the frame 11 over a major portion of the blade 22. It is commonly known that the increasing of this distance will permit deeper cuts with hacksaws such as the hacksaw 10 and thus this adjustment is believed to greatly enhance the utility of such equipment.

In a constructed model of a detachable unit, in accordance with the invention, the blade support 20 was fashioned from a sheet of plate steel. The slots 24 were designed to permit a 45° relative motion between the blade support 20 and the washer 21. The diameter of the bolt 18 was selected to be 5/16 of an inch and the radius of the arc on which the pins 26 were positioned was 12 inches which was equal to the distance between centers of the holes by which the blade 22 was supported.

Referring now to the detachable unit 17′ shown in Fig. 7, a detachable unit in accordance with a second embodiment of the invention is shown to comprise a conically shaped receptacle 35 to which the blade support 20 is affixed, a truncated conical portion 36 fastened to the end 38 of the bolt 18, a wing nut 37, and a threaded end 38a. The end 38a of the bolt 18 is passed through the receptacle 14 and the assembly is fixed in position by means of the wing nut 19 (not shown).

In operation, the wing nut 37 is loosened on the threaded end 38a so that the receptacle 35 can be separated from the truncated conical portion 36. Thus, the blade support 20 may be positioned at any angular relationship with the axis of the bolt 18. The wing nut 37 is then tightened so that the receptacle 35 frictionally engages the truncated conical portion 36 to thereby prevent relative motion between these two parts.

Referring now to the detachable unit 17″ shown in Figure 8, a detachable unit in accordance with a third embodiment of the invention is shown and comprises a receptacle 39 having a polygonal aperture such as the aperture 40. The receptacle 39 replaces structure previously described and illustrated in Figure 5. It can be seen that since the bolt 18 has a squared cross-section, the blade support 20 may be rotatably displaced around the axis of the bolt 18 at 45° angles due to the shape of the polygonal aperture 40. The aperture 40 may of course be provided with additional corners to provide additional settings for the blade support 20.

There will now be obvious to those skilled in the art many modifications and variations utilizing the principles set forth and realizing many or all of the objects and advantages of the apparatus described but which do not depart essentially from the spirit of the invention.

I claim:

1. A saw comprising a frame and a blade, and two blade supports positioned on said frame, one of said blade supports holding one end of said blade at substantially a point, the other of said blade supports having spaced ends and being rotatably coupled at one of said ends to the frame, the other end supporting the blade and including retaining means to position the other end of the blade fixedly in one of a number of positions whereby the blade describes a cone.

2. A saw as described in claim 1 in which said other of said blade supports comprises supports intermediate the ends so that the cone has an adjustable diameter base.

3. A saw comprising a frame, a blade, a first support positioned in said frame to hold one end of said blade at subtsantially a point and a detachable unit for supporting the other end of said blade, said detachable unit comprising spaced ends, one of said ends being rotatably coupled to said frame, the other of said ends supporting the associated end of said blade selectively at one of a number of points at least one of which is outside of the plane of said frame.

4. A saw as claimed in claim 3 in which said detachable unit comprises a plurality of pins for supporting said blade intermediate said spaced ends.

5. A saw as claimed in claim 4 in which said detachable unit comprises a second support for said pins and a bolt affixed to said frame for holding said second support.

6. A saw as claimed in claim 5 on which said bolt has a square head and said detachable unit comprises a washer with a substantially square hole, said washer engaging the square head of said bolt and said support for restricting motion therebetween.

7. A saw as claimed in claim 6 wherein said washer includes arcuate slots to permit a controlled positioning of said support with respect to said bolt.

8. For combination with a saw frame having blade receptacles each defining an axis and one end of a blade supported by a blade guide in one of said receptacles, a device for selectively positioning and supporting the other end of said blade, said device being positioned in the other of said blade receptacles and comprising first means for controlling the distance of the other end of said blade from the associated receptacle and second means for adjustably controlling the angular disposition of the other end with respect to the axis of associated receptacle.

9. A device such as claimed in claim 8, said device being detachable from the associated receptacle, in which said first means includes a plurality of pins, each being able to support the second end of said blade a predetermined distance from the associated receptacle and a support for supporting said pins.

10. A device such as claimed in claim 9 in which said second means comprises a bolt supported in the associated receptacle and a nut, said bolt being rotatably coupled to said support and held in position by said nut.

11. A device such as claimed in claim 10 in which said bolt has a squared head and comprising a washer having a substantially square hole, said washer engaging said support and the squared head of said bolt to restrict rotary motion between said bolt and said support.

12. A device such as claimed in claim 11 in which said washer includes arcuate slots, said device comprising means connected to said support and engaging the arcuate slots to allow a controlled positioning of said support with respect to said bolt.

13. A saw as claimed in claim 5, said unit comprising a truncated conical portion affixed to said bolt and a conical receptacle slidably engaging said truncated conical portion for positioning said support.

14. A saw as claimed in claim 5, said unit comprising a receptacle for positioning said support, said receptacle including a polygonal aperture for engaging said bolt.

15. A device as claimed in claim 10, said unit comprising a truncated conical portion affixed to said bolt and a conical receptacle slidably engaging said truncated conical portion for positioning said support.

16. A device as claimed in claim 10, said unit comprising a receptacle for positioning said support, said receptacle including a polygonal aperture for engaging said bolt.

References Cited in the file of this patent

UNITED STATES PATENTS

| 1,028,230 | Leonard | June 4, 1912 |
| 1,540,201 | Voltz | June 2, 1925 |
| 2,514,880 | Leatherman | July 11, 1950 |

FOREIGN PATENTS

| 531,505 | France | Oct. 25, 1921 |
| 60,387 | France | Apr. 21, 1954 |